(No Model.)
A. CALLAHAN.
MILLSTONE DRIVER.
No. 271,034. Patented Jan. 23, 1883.
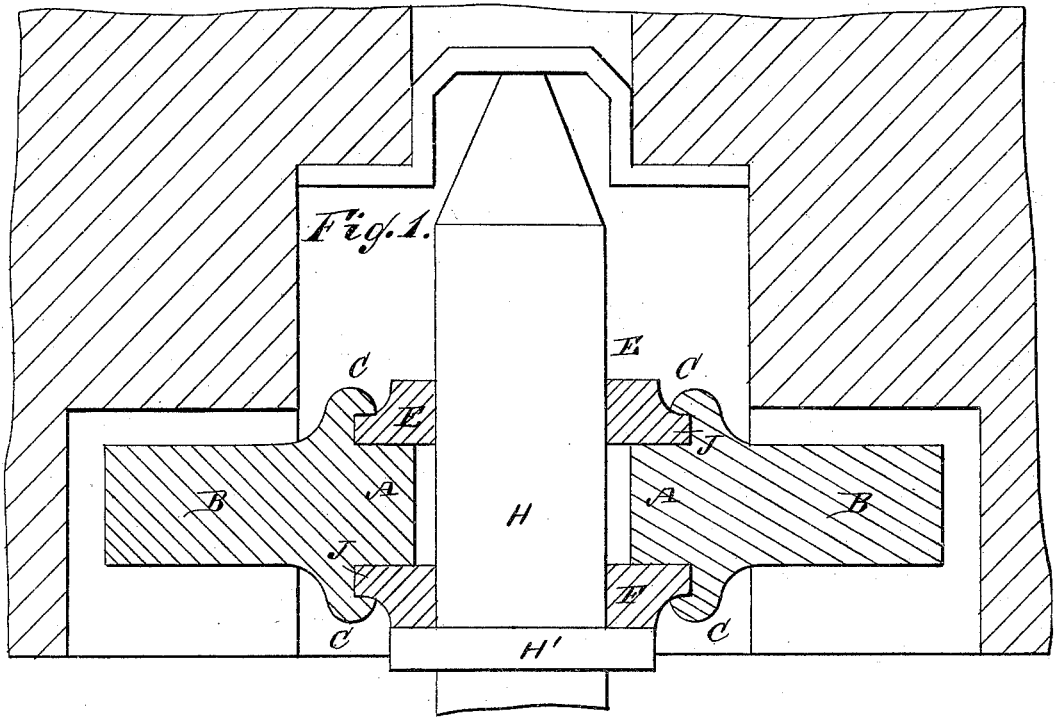
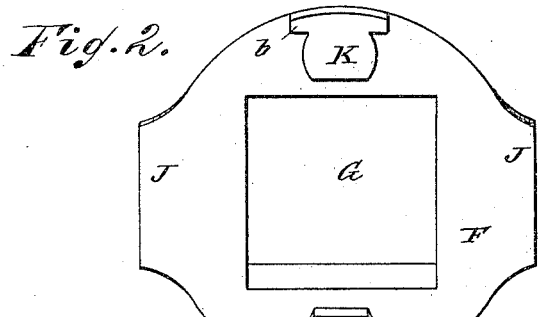
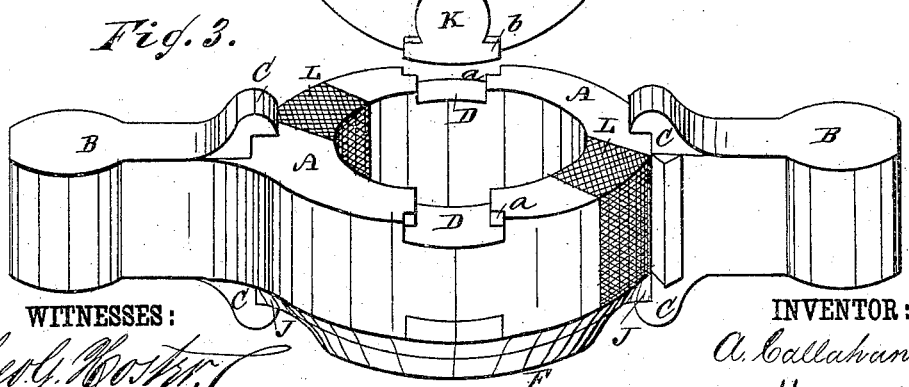
WITNESSES:
INVENTOR:
A. Callahan
BY
ATTORNEYS.

UNITED STATES PATENT OFFICE.

AMOS CALLAHAN, OF MARYVILLE, TENNESSEE, ASSIGNOR TO HIMSELF AND WILLIAM J. DAVIS, OF NEW YORK, N. Y.

MILLSTONE-DRIVER.

SPECIFICATION forming part of Letters Patent No. 271,034, dated January 23, 1883.

Application filed April 14, 1882. (No model.)

*To all whom it may concern:*

Be it known that I, AMOS CALLAHAN, of Maryville, in the county of Blount and State of Tennessee, have invented a new and Improved Millstone-Driver, of which the following is a full, clear, and exact description.

The object of my invention is to provide a new and improved millstone-driver which is composed of few parts and is strong and durable.

The invention, which is an improvement on the millstone-driver which I patented on the 14th day of February, 1882, No. 253,681, consists in a millstone-driver formed of two semicircular or like sections, having cushions interposed between the ends, and provided with arms and with undercut jaws, and transverse grooves or recesses in the upper and lower surfaces, combined with a top and bottom plate provided with lugs fitting under the undercut jaws, and with lugs fitting in the transverse grooves or recesses in the sections, whereby all the parts will be held together without the use of bolts or screws, and the construction of the driver is materially simplified.

Reference is to be had to the accompanying drawings, forming a part of this specification, in which similar letters of reference indicate corresponding parts in all the figures.

Figure 1 is a longitudinal sectional elevation of my improved millstone-driver. Fig. 2 is a perspective bottom view of the top plate, showing the same raised. Fig. 3 is a perspective view of my improved millstone-driver, showing the top plate removed.

The millstone-driver is formed of two semicircular parts or sections, A, each being provided at one end with a radial arm, B, of greater or less length. The sections are provided on the upper and lower surfaces, and at the inner ends of the arms B, with undercut jaws C, extending across the inner ends of the arms, with the undercut sides of the jaws toward the inner sides of the semicircular sections. The sections A are provided in the upper and lower surfaces, and at or near the middles, with transverse grooves D, which have lateral enlargements *a* at the outer ends. The top plate, E, and the bottom plates, F, are each provided with a square or circular aperture, G, for the spindle H, and at diametrically-opposite points are provided with lugs J, projecting from the peripheries of the plates, and adapted to pass into the undercut parts of the jaws C. The plates E and F are provided at diametrically-opposite points on the inner surfaces with T-shaped lugs K, having the sides rounded or made convex, and provided at the outer ends with lateral enlargements *b*. The sections A A are placed together, as shown, and cushions L, of rubber or other suitable elastic material, are interposed between the meeting ends of the sections in such a manner that the cushions will be opposite each other, and the sections A, with the cushions L, form a complete circle or ring. The bottom plate, F, rests upon the collar H' of the spindle, and the sections A A and cushions L rest on this plate F, the lugs K of the plate F passing into the bottom grooves or recesses, D, and the lugs J of this plate F passing into the lower undercut jaws C. The top plate, E, rests on the sections A A and the cushions L, its lugs J passing into the upper undercut jaws C. The enlargements *b* of the lugs K fit into the enlargements *a* of the recesses or grooves D and prevent the lugs K from passing out of the grooves or recesses D. The several parts of the driver are thus united without the use of bolts or screws. The driver consists of few parts, and can readily be inserted into the stone or removed, is elastic and self-adjusting, and produces an easy, steady movement of the stone. The rounded sides of the lugs K permit of a slight movement or play of the sections A, due to the compression and expansion of the cushions L.

Having thus described my invention, I claim as new and desire to secure by Letters Patent—

1. In a millstone-driver, the combination, with the sections A, provided with arms B and undercut jaws C and grooves or recesses D, of cushions L, interposed between the ends of the sections, and top and bottom plates, E and F, provided with lugs J, fitting under the undercut jaws C, and with lugs K on the under side, which lugs K fit within the grooves or recesses D, substantially as herein shown and described, and for the purpose set forth.

2. In a millstone-driver, the combination, with the sections A, provided with arms B and undercut jaws C and grooves or recesses D, provided at the outer ends with lateral enlargements $a$, of cushions L, and the top and bottom plates, E and F, provided with lugs J, and on the under side with lugs K, having lateral enlargements $b$ at the outer ends, substantially as herein shown and described, and for the purpose set forth.

AMOS CALLAHAN.

Witnesses:
OSCAR F. GUNZ,
C. SEDGWICK.